US011556752B2

(12) United States Patent
Carroll, II et al.

(10) Patent No.: US 11,556,752 B2
(45) Date of Patent: Jan. 17, 2023

(54) MULTI-FACED PAYMENT CARD WITH PARTITIONED DUAL SMART CHIPS AND ANTENNAE

(71) Applicant: Capital One Services, LLC, McLean, VA (US)

(72) Inventors: William Fowler Carroll, II, McLean, VA (US); Daniel John Marsch, McLean, VA (US); Bryant Alan Yee, McLean, VA (US); Andrea Montealegre, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/245,496

(22) Filed: Apr. 30, 2021

(65) Prior Publication Data

US 2021/0256343 A1  Aug. 19, 2021

Related U.S. Application Data

(62) Division of application No. 16/657,896, filed on Oct. 18, 2019, now Pat. No. 11,003,979.

(51) Int. Cl.
  *G06Q 40/00* (2012.01)
  *G06K 19/077* (2006.01)
  (Continued)

(52) U.S. Cl.
  CPC . *G06K 19/07773* (2013.01); *G06K 19/07722* (2013.01); *G06Q 20/24* (2013.01); *G06Q 20/26* (2013.01); *G06Q 20/352* (2013.01)

(58) Field of Classification Search
  CPC ....... G06K 19/07773; G06K 19/07722; G06Q 20/24; G06Q 20/26; G06Q 20/352
  See application file for complete search history.

(56) References Cited

U.S. PATENT DOCUMENTS

| 11,238,436 B2 * | 2/2022 | Mooppanar | ........ G06Q 20/3676 |
| 2006/0293952 A1 * | 12/2006 | Nicholson | .......... G06Q 30/0219 |
| | | | 705/14.36 |

(Continued)

FOREIGN PATENT DOCUMENTS

| EP | 3400628 B1 * | 6/2022 | ............. G04G 21/00 |
| KR | 200434239 Y1 * | 12/2006 | |

(Continued)

*Primary Examiner* — Rajesh Khattar
(74) *Attorney, Agent, or Firm* — Perkins Coie LLP

(57) ABSTRACT

The disclosed embodiments provide a payment card. The payment card may have a first face and a second face opposite the first. Additionally, the payment card may comprise a first smart chip, the first smart chip having contacts that are electronically accessible from the first face of the card. The payment card may further comprise a first antenna coupled to the first smart chip, the first antenna providing near-field contactless access to the first smart chip and a second smart chip, the second smart chip having contacts that are electronically accessible from the second face of the card. Additionally, the payment card may comprise a second antenna coupled to the second smart chip, the second antenna providing near-field contactless access to the second smart chip and an RF block that electronically isolates the first antenna and the second antenna from each other.

20 Claims, 6 Drawing Sheets

(51) Int. Cl.
G06Q 20/34 (2012.01)
G06Q 20/26 (2012.01)
G06Q 20/24 (2012.01)

(56) References Cited

U.S. PATENT DOCUMENTS

| | | | | |
|---|---|---|---|---|
| 2007/0075132 | A1* | 4/2007 | Kean | G06K 19/07716 |
| | | | | 235/492 |
| 2012/0136733 | A1* | 5/2012 | Mason | G06Q 30/0641 |
| | | | | 705/16 |
| 2017/0161739 | A1* | 6/2017 | Singh | G06Q 20/105 |
| 2017/0270525 | A1* | 9/2017 | Valdez | G06Q 20/405 |
| 2020/0394370 | A1* | 12/2020 | Garrett | G06Q 20/349 |

FOREIGN PATENT DOCUMENTS

| | | | |
|---|---|---|---|
| KR | 20070118999 A | * | 12/2007 |
| KR | 440089 Y1 | * | 5/2008 |

* cited by examiner

MULTI-FACED PAYMENT CARD WITH PARTITIONED DUAL SMART CHIPS AND ANTENNAE

CROSS REFERENCE TO RELATED APPLICATIONS

This application is a divisional application of U.S. patent application Ser. No. 16/657,896 filed on Oct. 18, 2019, the content of which foregoing application is incorporated herein in its entirety by reference.

TECHNICAL FIELD

The present disclosure provides multi-faced payment cards allowing a user to combine the capability of multiple payment cards into a single card while retaining the full functionality of the multiple cards. In particular, in some embodiments, the payment card may include two antennae and two smart chips that are arranged on the payment card in a way that the antennae and chips do not interfere with each other.

BACKGROUND

Consumers often have multiple credit and debit cards. Carrying multiple credit and debit cards may be an inconvenience for consumers, who may prefer to carry minimal payment cards while enjoying the benefit of having multiple payment cards (e.g., membership rewards, miles, and credit score). Further, some wallets may not include enough card slots for all a consumer's payment cards. Moreover, a wallet filled with multiple payment cards may not fit into a consumer's purse or pocket. In view of these and other shortcomings, a multi-faced payment card that combines multiple payment cards into a single card is disclosed. The multi-faced payment card of the present disclosure provides, among other things, the ability to deploy more than one smart chip and contactless payment antennae on a single card while eliminating interference during operation, and enabling a user to select between available payment accounts supported by the card.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

Disclosed embodiments provide a payment card, the card having a first face and a second face opposite the first. Certain embodiments of the card may include a first smart chip, the first smart chip having contacts that are electronically accessible from the first face of the card, a first antenna coupled to the first smart chip, the first antenna providing near-field contactless access to the first smart chip. The card may also have a second smart chip, the second smart chip having contacts that are electronically accessible from the second face of the card. Such embodiments may also include a second antenna coupled to the second smart chip, the second antenna providing near-field contactless access to the second smart chip and an RF block that electronically isolates the first antenna and the second antenna from each other.

Disclosed embodiments also provide a system for transacting using a payment card. For example, certain embodiments may include a card reader having a user input coupled to a one or more memory devices storing instructions, and one or more processors configured to execute the instructions to read, via the card reader, data from a plurality of smart chips associated with a payment card presented to complete a transaction. Each of the smart chips may be associated with a corresponding financial service account, and the system may receive a user input selecting one of the plurality of financial service accounts to use in completing the transaction and complete the transaction using the selected financial account.

Disclosed embodiments also provide a method for transacting a payment using a card reader having a user input. For example, certain embodiments may include reading, via the card reader, data from a plurality of smart chips associated with the payment card presented to complete a transaction, each of the smart chips being associated with a corresponding financial service account. The method may further include receiving a user input selecting one of the plurality of financial service accounts to use in completing the transaction and completing the transaction using the selected financial account.

In accordance with additional embodiments of the present disclosure, a computer-readable medium is disclosed that stores instructions that, when executed by one or more a processor, causes the one or more processors to perform operations consistent with one or more disclosed methods.

The foregoing general description and the following detailed description are exemplary and explanatory only and are not restrictive of the claims.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts.

As described in further detail herein, the disclosed embodiments are directed to a multi-faced payment cards allowing a user to combine the capability of multiple payment cards into a single card while retaining the full functionality of the multiple cards.

Figure 1:
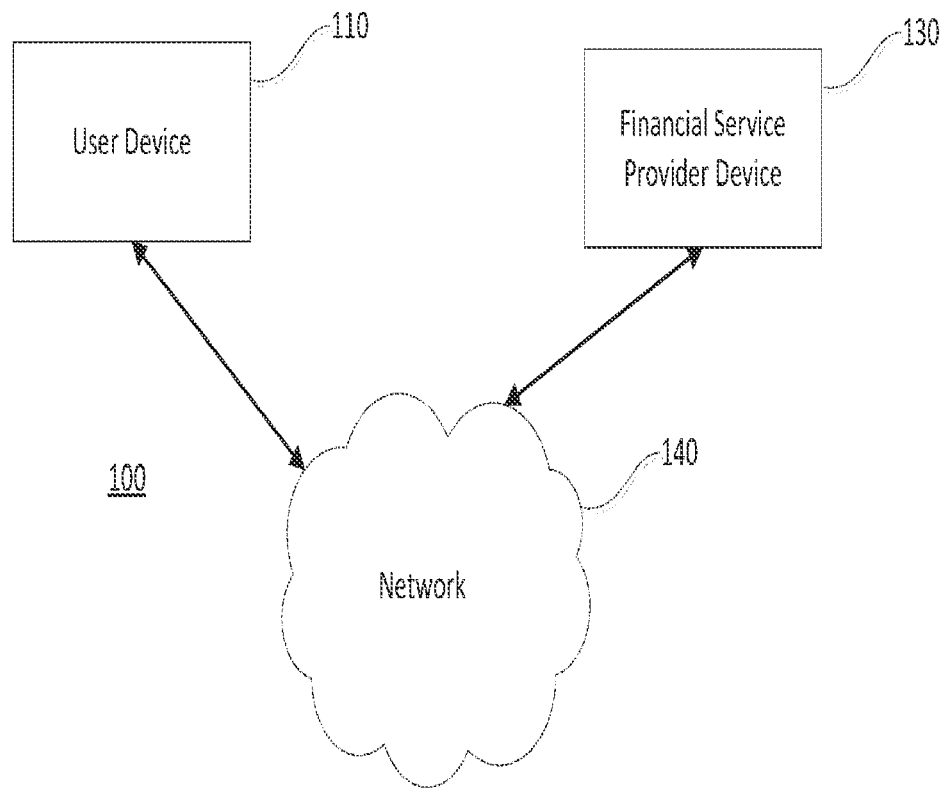
FIG. 1 is a block diagram of an exemplary system, consistent with disclosed embodiments.

FIG. 1 shows a diagram of an exemplary system 100, consistent with disclosed embodiments. As shown in FIG. 1, system 100 may include a user device 110, a local financial service provider (FSP) device 130, and a network 140 to facilitate communication among the components of system 100. The components and arrangement of the components included in system 100 may vary. System 100 may include other components that perform or assist in the performance of one or more processes consistent with the disclosed embodiments. The components and arrangements shown in FIG. 1 are not intended to limit the disclosed embodiments, but are exemplary components used to implement the disclosed processes and features.

System 100 may include one or more local FSP devices 130. Local FSP devices may include, for example, automated teller machines (ATMs) or detection devices (e.g. a card reader) in local FSP branches. Local FSP devices 130 may include any card reader device (e.g., card reader at a grocery store checkout). Local FSP device 130 may include one or more memory device(s) that store data that may be used for performing one or more processes consistent with the disclosed embodiments. For example, local FSP device 130 may include one or more memory device(s) storing data and software instructions, and one or more processors configured to use the data and execute the software instructions to perform computing functions and operations known to those skilled in the art for interacting with a payment card and facilitating a transaction. In certain aspects, local FSP device 130 may additionally, or alternatively, include one or more servers or other types of computer devices, which may be configured to execute software instructions stored in memory to perform one or more processes consistent with the disclosed embodiments.

Local FSP device 130 may include, for example, a card slot or reader, near-field communications for, among other things, interacting with contactless payment cards, a screen, a keyboard or on-screen touchpad, a cash dispenser, a speaker, a camera, a scanning device, and/or a receipt printer.

Local FSP device 130 may further include one or more servers that are configured to execute stored software instructions to perform operations associated with collecting, storing, and accessing biometric data, including one or more processes associated with gathering biometric data from a variety of sources, compiling the data, and organizing the data into easily accessible profiles. Local FSP device 130 may include one or more servers that may be a general purpose computer, a mainframe computer, or any combination of these components. In certain embodiments, local FSP device 130 (or a system including local FSP device 130) may be configured as a particular apparatus, system, and the like based on the storage, execution, and/or implementation of the software instructions that cause a processor to perform one or more operations consistent with the disclosed embodiments. A local FSP device 130 may be standalone, or it may be part of a subsystem, which may be part of a larger system. For example, local FSP device 130 may represent distributed servers that are remotely located and communicate over a public network (e.g., network 140) or a dedicated network, such as a LAN. An exemplary computer system consistent with local FSP device 130 is discussed in additional detail with respect to FIG. 2. In certain embodiments, a third party may operate the components associated with local FSP device 130.

System 100 may further include one or more user devices 110. A user may operate a user device 110, which may be a desktop computer, laptop, tablet, smartphone, multifunctional watch, pair of multifunctional glasses, tracking device, or any suitable device with computing capability. User device 110 may include one or more processors and memory devices known to those skilled in the art. For example, user device 110 may include one or more memory devices that store data and software instructions that, when executed by the one or more processors, perform operations consistent with the disclosed embodiments. In one aspect, user device 110 may have an interactive display providing controls for defining temporal, geographic, or multi-factor authentication constraints for one or more customer-defined transaction rules. In another aspect, user device 110 may have a financial application installed thereon, which may enable user device 110 to communicate with local FSP device 130 via network 140. For instance, user device 110 may be a smartphone, tablet, wearable device, or the like that executes a stored mobile application that performs online banking operations. In other embodiments, user device 110 may connect to local FSP device 130 through use of browser software stored and executed by user device 110. User device 110 may be configured to execute software instructions to allow a user to access information stored in local FSP device 130, such as, for example, financial information related to recent purchase transactions, financial discounts, financial statements, account information, rewards program information and the like. Additionally, user device 110 may be configured to execute software instructions that initiate and conduct transactions with local FSP device 130, such as, for example, ATM withdrawals, wire transfers, debit card PIN resets, call center transactions, or any purchase using a contact or contactless card reader. An exemplary purchase includes a purchase at a merchant (e.g., purchases at a store, shopping mall, or the like). An exemplary computer system consistent with user device 110 is discussed in additional detail with respect to FIG. 2.

A user may operate local FSP device 130 and/or user device 110 to perform one or more operations consistent with the disclosed embodiments. In one aspect, a user may be a customer of a financial service provider. Alternatively, the user may be a customer of a financial service provider, and the financial service provider may be associated with FSP device 130 (e.g., FSP device 130 may be a third party in relation to the financial service provider, such as a third-party ATM or card reader device). Financial service provider may maintain a financial service account (e.g., checking account, savings account, debit card account, or credit card account) for the user to use to purchase goods and/or services. Additionally or alternatively, the user may use local FSP device 130 and/or user device 110 and the financial service account (for example, through a mobile application installed on user device 110) to withdraw cash from an ATM, contact a customer call center, transfer or wire money, reset an account PIN, or make a purchase transaction.

A user may further operate local FSP device 130 and/or user device 110 in order to determine which of the two or more payment methods, accounts, and/or payment card numbers (hereinafter "multiple cards") associated with the multi-faced payment card to use in performing a transaction at local FSP device 130. For example, a card reader of local FSP device 130 may detect multiple cards of multi-faced payment card. The user may then use user device 110 to provide instructions via network 140 on which payment card of the multi-face payment card local FSP device 130 should use to initiate, conduct, complete a financial transaction, and/or make a purchase. For example, in such an embodiment, local FSP device 130 may have a card reader having a user input coupled to a one or more memory devices storing instructions and one or more processors configured to execute the instructions to read, via the card reader data from a plurality of smart chips, contactless antennae, and/or magnetic strips associated with a payment card presented to complete a transaction, each smart chip, contactless antenna, and/or magnetic strip being associated with a corresponding financial service account. Local FSP device 130 may then receive a user input from user device 110 selecting one of the plurality of financial service accounts to use in completing the transaction. In response to receiving the input from user device 110, local FSP device 130 may complete the transaction using the selected financial account. Alternatively, local FSP device may prompt the user to select a desired financial service account associated with the multi-faced payment card via its display and inputs, as opposed to receiving input via user device 110.

Network 140 may comprise any type of computer networking arrangement used to exchange data. For example, network 140 may be the Internet, a private data network, a virtual private network using a public network, a Wi-Fi network, a LAN or WAN network, and/or other suitable connections that may enable information exchange among various components of the system 100. Network 140 may also include a public switched telephone network ("PSTN") and/or a wireless cellular network. Network 140 may be a secured network or unsecured network. In other embodiments, one or more components of system 100 may communicate directly through one or more dedicated communication links, such as links between user device 110 and local FSP device 130.

Additionally or alternatively, network 140 may include a direct communication network. Direct communications may use any suitable technologies, including, for example, BLUETOOTH™, BLUETOOTH LE™ (BLE), Wi-Fi, near field communications (NFC), or other suitable communication methods that provide a medium for transmitting data between separate devices. In certain embodiments, user device 110 and local FSP device 130 may connect and communicate through a direct communications network.

Other components known to one of ordinary skill in the art may be included in system 100 to process, transmit, provide, and receive information consistent with the disclosed embodiments.

Figure 2:
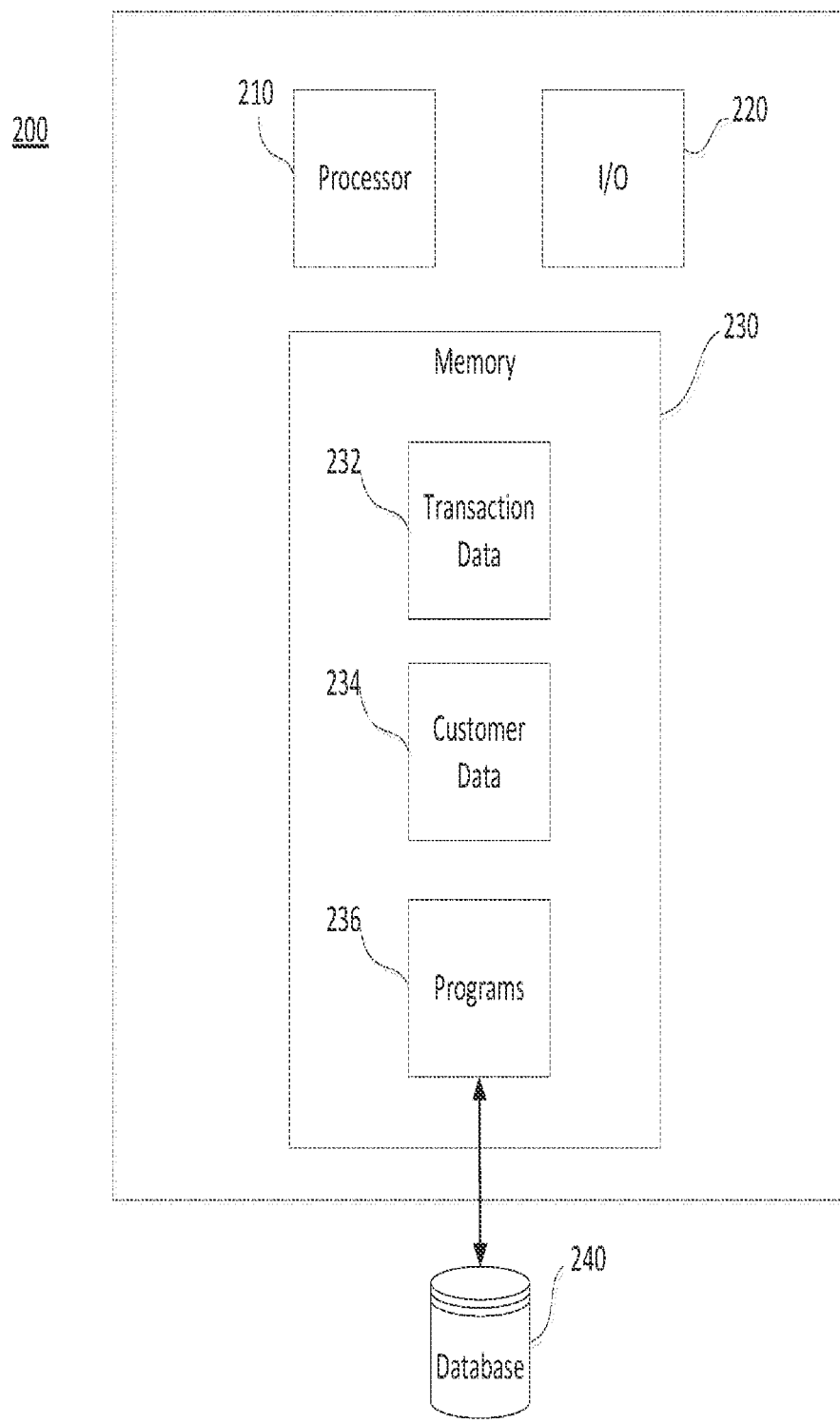
FIG. 2 is a block diagram of an exemplary computer system, consistent with disclosed embodiments.

FIG. 2 shows a diagram of computing system 200, illustrating an exemplary computing system configuration that may be associated with local FSP device 130 and/or user device 110, consistent with disclosed embodiments. In some embodiments, computing system 200 may include one or more processors 210, one or more memories 230, and one or more input/output (1/0) devices 220. In some embodiments, computing system 200 may take the form of a server, general purpose computer, a mainframe computer, laptop, smartphone, mobile device, wearable device, or any combination of these components. In certain embodiments, computing system 200 (or a system including computing system 200) may be configured as a particular apparatus, system, or the like enabling the storage, execution, and/or implementation of software instructions that cause one or more processors to perform one or more operations consistent with the disclosed embodiments. Computing system 200 may be stand-alone, or it may be part of a subsystem, which may be part of a larger system.

Processor 210 may include one or more known processing devices, such as a microprocessor from the Pentium™ or Xeon™ family manufactured by Intel™, the Turion™ family manufactured by AMO™, or any of various processors manufactured by Sun Microsystems. Processor 210 may constitute a single core or multiple core processor that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow computing system 200 to execute multiple processes simultaneously. One of ordinary skill in the art would understand that other types of processor arrangements could be implemented that provide for the capabilities disclosed herein. The disclosed embodiments are not limited to any type of processor(s) configured in computing system 200.

Memory 230 may include one or more storage devices configured to store instructions used by processor 210 to perform functions related to the disclosed embodiments. For example, memory 230 may be configured to store one or more software instructions, such as program(s) 236, that may perform one or more operations when executed by processor 210. The disclosed embodiments are not limited to separate programs or computers configured to perform dedicated tasks. For example, memory 230 may store a program 236 that performs the functions of computing system 200, or program 236 could comprise multiple programs. Additionally, processor 210 may execute one or more programs located remotely from computing system 200. For example, user device 110 may, via computing system 200 (or variants thereof), access one or more remote programs that, when executed, perform functions related to certain disclosed embodiments. Processor 210 may further execute one or more programs located in database 240. In some embodiments, programs 236 may be stored in an external storage device, such as a cloud server located outside of computing system 200, and processor 210 may execute programs 236 remotely. Memory 230 may be a volatile or non-volatile, magnetic, semiconductor, tape, optical, removable, non-removable, or other type of storage device or tangible (i.e., non-transitory) computer-readable medium.

Programs executed by processor 210 may cause processor 210 to execute one or more processes related to financial services provided to users including, but not limited to, processing credit and debit card transactions, checking transactions, fund deposits and withdrawals, transferring money between financial accounts, lending loans, processing payments for credit card and loan accounts, processing ATM cash withdrawals, authenticating a user, and/or viewing or updating financial account information associated with a user.

Memory 230 may also store data that may reflect any type of information in any format that the system may use to perform operations consistent with the disclosed embodiments. Memory 230 may store instructions to enable processor 210 to execute one or more applications, such as server applications, an authentication application, network communication processes, and any other type of application or software. Alternatively, the instructions, application programs, etc., may be stored in an external storage (not shown) in communication with computing system 200 via network 140 or any other suitable network.

Memory 230 may include transaction data 232. Transaction data 232 may include information related to financial transactions initiated by a user. For example, transaction data may include online credentials, such as a username and password. In further examples, transaction data may include a user identifier and a transaction type. The user identifier may be a credit or debit card number, an account number, or another means for identifying the user initiating the financial transaction. The transaction type may include an indicator of the type of transaction the user is initiating, such as, ATM cash withdrawal, deposit transaction, cash a check transaction, make change transaction, check balance transaction, currency exchange transaction, debit PIN reset, money wire or transfer, call to the customer service center, or other transactions requiring user authentication. Transaction data 232 may also include authentication data obtained from the user for the purposes of authorizing the transaction, for example, by verifying the online credentials compared to backend online credentials on record for the customer or authenticity of provided biometric data as compared to stored biometric data. Additionally or alternatively, transaction data 232 may be stored in database 240 or in an external storage (not shown) in communication with computing system 200 via network 140 or any other suitable network. In some embodiments, transaction data 232 may include biometric data received from the user.

Memory 230 may further include customer data 234. Customer data 234 may include information about particular customers of the financial service provider. For example, client data 234 may include clients' online credentials, account information, debit or credit card information, history of purchase transactions, financial statements, credit score, risk profile, username and password, debit card PIN, home and work locations, and/or biometric information. Additionally, customer data 234 may include user device identification information, such as, for example, a phone number, email address, IP address, BLUETOOTH™ signature, or other device identifier. Alternatively, customer data 234 may be stored in database 240 or in an external storage (not shown) in communication with computing system 200 via network 140 or any other suitable network.

Processor 210 may analyze transaction data 232 in reference to customer data 234. For example, processor 210 may analyze transaction data to determine which client with information stored in client information 234 is initiating the financial transaction. In some embodiments, in determining which client with information stored in client information 234 is initiating the financial transaction, the transaction data is a hashed version of the transaction data. Processor 210 may access the particular user's customer information to determine the user's account information, debit or credit card information, history of purchase transactions, financial statements, credit score, risk profile, username and password, debit card PIN, home and work locations, and/or authentication data.

I/O devices 220 may be one or more device that is configured to allow data to be received and/or transmitted by computing system 200. I/O devices 220 may include one or more digital and/or analog communication devices that allow computing system 200 to communicate with other machines and devices, such as other components of system 100 shown in FIG. 1. For example, computing system 200 may include interface components, which may provide interfaces to one or more input devices, such as one or more keyboards, mouse devices, and the like, which may enable computing system 200 to receive input from an operator of local FSP device 130 or user device 110.

Computing system 200 may also contain one or more database(s) 240. Alternatively, computing system 200 may be communicatively connected to one or more database(s) 240. Computing system 200 may be communicatively connected to database(s) 240 through network 140. Database 240 may include one or more memory devices that store information and are accessed and/or managed through computing system 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request and the data contained in the request, etc. Systems and methods of disclosed embodiments, however, are not limited to separate databases. Database 240 may include computing components (e.g., database management system, database server, etc.) configured to receive and process requests for data stored in memory devices of database(s) 240 and to provide data from database 240.

As discussed above, local FSP device 130 may include at least one computing system 200. Further, although sometimes discussed here in relation to local FSP device 130, it should be understood that variations of computing system 200 may be used by other components of system 100, including any card reader and user device 110. Computing system 200 may be a single server or computer, or may be configured as a distributed computer system including multiple servers or computers that interoperate to perform one or more of the processes and functionalities associated with the disclosed embodiments.

In some aspects, local FSP device 130 and/or user device 110 may include the same or similar configuration and/or components of computing system 200. For example, computing system 200, when implemented in local FSP device 130, may include hardware and/or software installed therein for performing one or more processes disclosed herein.

Figure 3A:
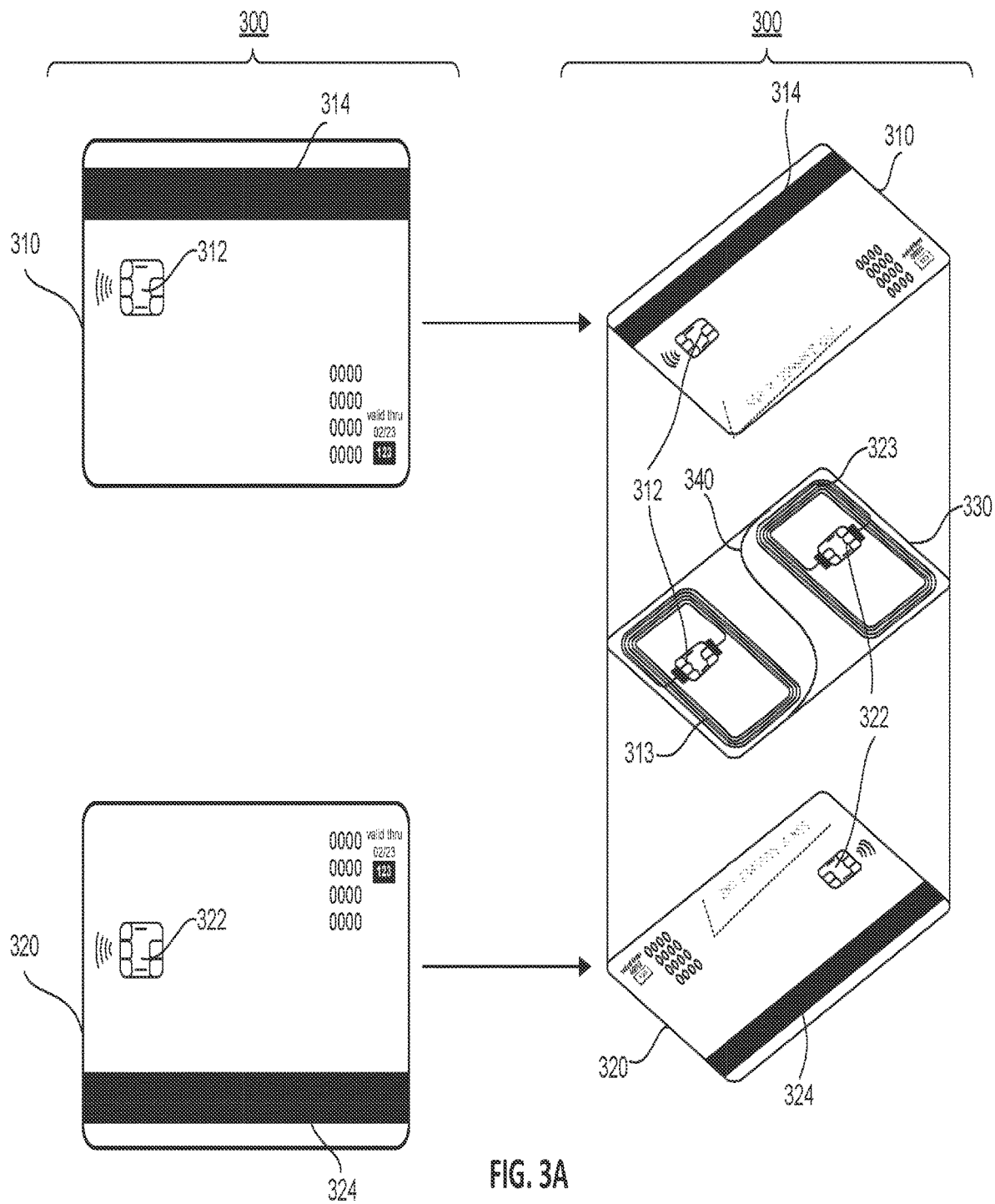
FIG. 3A is an exemplary multi-faced payment card with partitioned dual smart chips and antennae, consistent with disclosed embodiments.

FIG. 3A is an exemplary multi-faced payment card 300 with partitioned dual smart chips and antennae. Payment card 300 may include two faces-face 310 and face 320. Face 320 may be opposite face 310. Payment card 300 may further include two smart chips, chip 312 and chip 322, two antennae, antenna 313 and antenna 323, and two magnetic strips, magnetic strip 314 and magnetic strip 324.

Payment card 300 shows an exploded view of payment card 300 including partitioned antennae layer 330 in between face 310 and face 320. In some embodiments and as depicted in payment card 300, antenna 313, antenna 323, and a metallic piece (e.g. RF block 340) may be embedded in a middle layer of the card (e.g., partitioned antennae layer 330). Antenna 313 and antenna 323 may be electronically isolated from each other by the metallic piece (e.g. RF block 340). The metallic piece may be made of any ferromagnetic metal (i.e. anything containing iron, nickel or cobalt). In some embodiments, the metallic piece may be any alloy designed to shield electronics. Furthermore, the metallic piece may be a strip running perpendicular to the middle layer of the card. In some embodiments, antenna 313 may be positioned on face 310 of payment card 300, antenna 323 may be positioned on face 320 of payment card 320, and a metallic piece (e.g. RF block 340) may be positioned between face 310 and face 320 of payment card 300. The metallic piece (e.g. RF block 340) may act as a shield blocking the antennae, e.g., antenna 313 and antenna 323, preventing interference between the antennae and thus preventing them from affecting each other while in operation. RF block 340 may be positioned in any location in the card so long as RF block 340 prevents the antennae from affecting each other when more than one antenna is energized by a card reader. For example, RF block 340 may be positioned in a diagonal or vertical fashion, or may comprise a curved shape to isolate each antenna from one another. In some embodiments, the middle layer of the payment card may be made of plastic. In some embodiments, payment card can be made of any grouping of materials that do not interfere with signaling, such as wood, paper, plastic, ceramic, glass, leather, composites, etc. In some embodiments, the payment card may contain materials that can interfere with signaling but those materials may be placed in a manner that will not interfere, such as placing the materials that can interfere with signaling on opposite edges of a card or on different layers of a card. In some embodiments, antennae may be any conductive material such as a metal or semiconductor material. In some embodiments, antennae may be made of copper.

In certain embodiments, RF block 340 may comprise a separate layer within an interior of antennae layer 330. In such embodiments, RF block 340 may comprise an RF blocking layer (not shown) comprising one or more of the above materials, which isolates the antennae 313, 323. Each of the antennae 313, 323 may be disposed on an opposite face of the RF blocking layer, which in turn is position between faces of antenna layer 330 that support the antenna 313, 323.

Card 300 includes magnetic strip 314 readable from face 310 of card 300 and magnetic strip 324 readable from face 320 of card 300. In some embodiments, smart chip 312 and magnetic strip 314 are associated with a first financial service account and smart chip 322 and magnetic strip 324 are associated with a second financial service account. In some embodiments, chip 312 and chip 322 comprise a system on a chip (SOC). In other embodiments, chip 312 and chip 322 comprise Europay, Mastercard and Visa (EMV) chips.

In some embodiments, face 310 matches magnetic strip 314 in at least one of appearance or color. In some embodiments, face 310 matches chip 312 in at least one of appearance or color. For example, face 310 and magnetic strip 314 may be light and dark orange, respectively, in order to represent to the user that magnetic strip 314 is associated with the financial service account represented on face 310. In some embodiments, face 320 matches magnetic strip 324 in at least one of appearance or color. In some embodiments, face 320 matches chip 322 in at least one of appearance or color. For example, face 320 and magnetic strip 324 may be decorated in light and dark blue to represent to the user that magnetic strip 324 is associated with the financial service account represented on face 320. This arrangement may, for example, indicate that face 310, chip 312, and magnetic strip 314 are associated with a debit card account, and face 320, chip 322, and magnetic strip 324 are associated with a credit card account.

In some embodiments, payment card 300 may include four smart chips and four antennae associated with four financial service accounts as described below in reference to FIG. 4. In such an embodiment, each face of payment card 300 may have two smart chips. A consumer may, for example, when inserting payment card 300 at a card reader, flip payment card 300 over and/or end-to-end to pay with any of four different financial service accounts (i.e., with any of the four chips or four antennae of the card). In such an embodiment, the payment card 300 may include four antennae each coupled to four different smart chips and may provide near-field contactless access to the smart chips as well. Furthermore, RF block 340 may electronically isolate the first antenna, the second antenna, the third antenna, and the fourth antenna from each other.

Figure 3B:
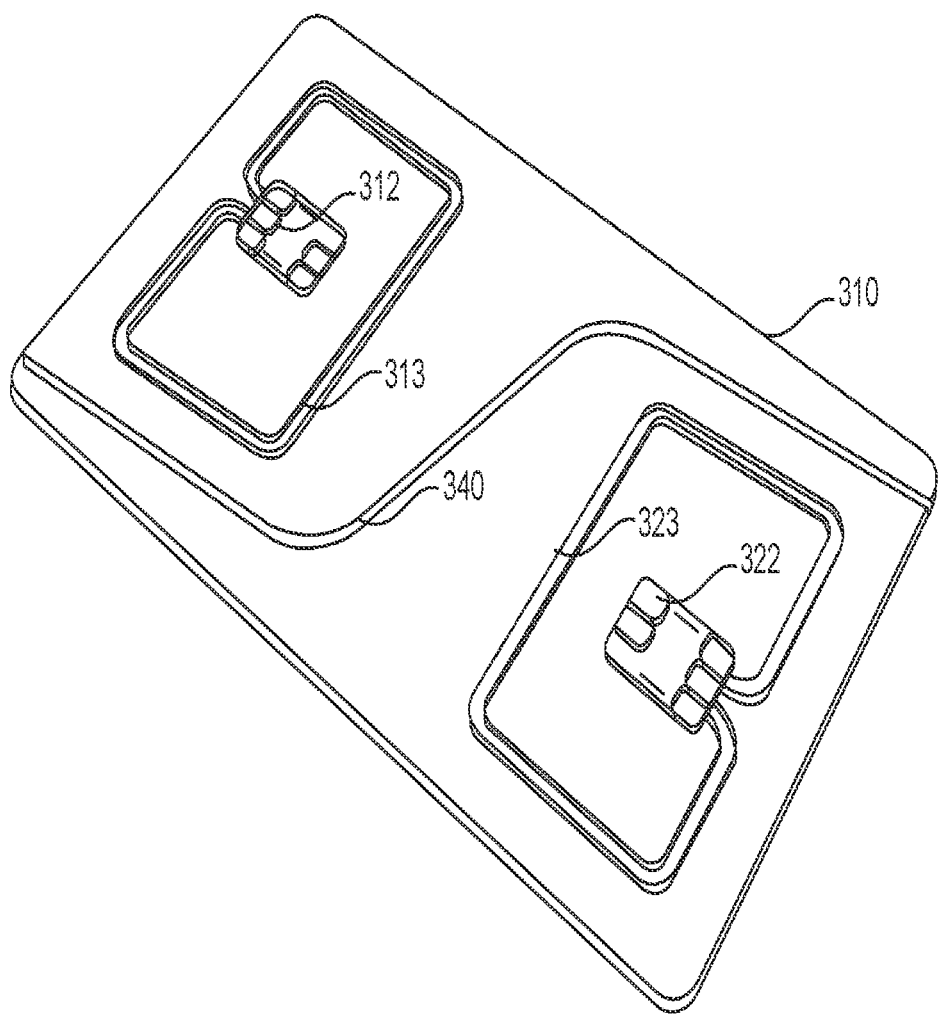
FIG. 3B is an exemplary perspective view of a multi-faced payment card with partitioned dual smart chips and antennae, consistent with disclosed embodiments.

FIG. 3B is an exemplary perspective view of a multi-faced payment card with partitioned dual smart chips and antennae of FIG. 3A, consistent with disclosed embodiments. FIG. 3B includes chips 312 and 322 on face 310 of payment card 300. In some embodiments, two or more chips may be placed on a face of payment card 300. In such an embodiment, each of the two or more chips may be associated with two or more antennae that are electrically isolated from each other by one or more RF blocks 340. In use, card 300 may be inserted into a card reader from either end and/or either side such that either chip 312 or 322 is read and used for a transaction. For contactless transactions, one of the antennae 313, 323 may be energized by a card reader while the RF block 340 ensures the other is isolated. In such embodiments, one antenna is sufficiently energized to provide a response that may be read while the other antennae is isolated by RF block 340 such that it cannot attain sufficient power to respond or register.

Figure 4:
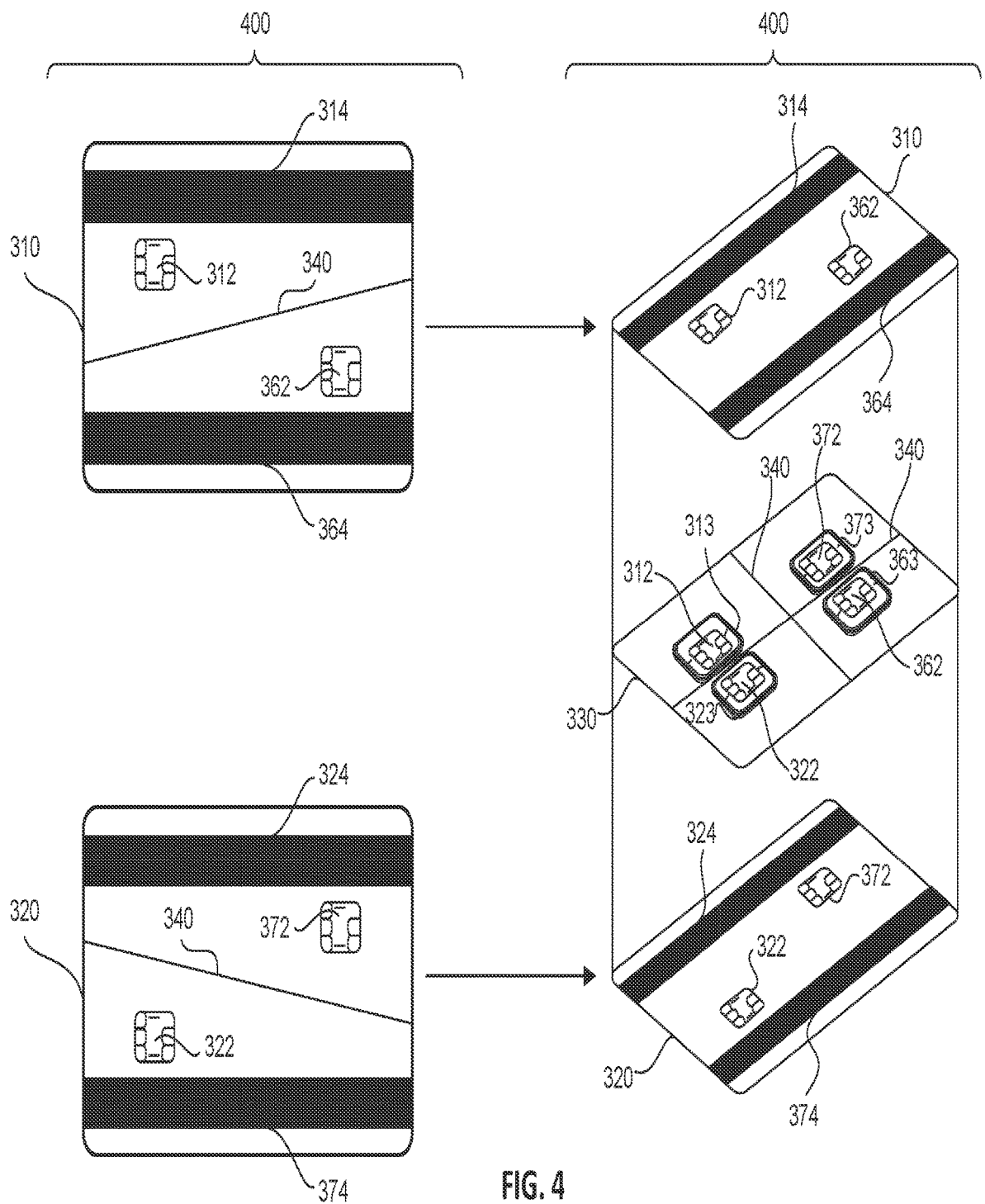
FIG. 4 is an exemplary multi-faced payment card with multiple partitioned smart chips and antennae, consistent with disclosed embodiments.

FIG. 4 is an exemplary multi-faced payment card 400 with partitioned four smart chips and four antennae. Payment card 400 may include two faces-face 310 and face 320. Face 320 may be opposite face 310. Payment card 300 may further include four smart chips, chip 312, chip 322, chip 362, and chip 372, four antennae, antenna 313, antenna 323, antenna 363, and antenna 373, and four magnetic strips, magnetic strip 314, magnetic strip 324, magnetic strip 364, and magnetic strip 374.

In some embodiments, payment card 300 may include four smart chips and four antennae, one chip and antennae associated with one financial service account. In such an embodiment, each face of payment card 300 may have two exposed smart chips. A consumer may, for example, when inserting payment card 300 at a card reader, flip payment card 300 over and/or end-to-end to pay with any of four different financial service accounts (i.e., with any one of the four chips). A consumer may also use any one of the four antennae, each coupled to a different smart chip, to engage in a contactless transaction via near-field communication with a reader. Each of the antennae may enable a card reader to wirelessly interact with the smart chips. In the process, RF block 340 may electronically isolate antenna 313, antenna 323, antenna 363, and antenna 373 from one another to reduce interference. In some embodiments, the antennae may be arranged to maximize a distance between coils of the antennae along the card and their strength upon energization should be minimized to only what may necessary for performing transactions. Smart chips (chip 312, chip 322, chip 362, and chip 372) may be placed anywhere in the card and may, in alternative embodiments, include multiple antennae. The contacts for the chips may be placed such that they can be used for insertion and the chips may be placed below the contacts.

Figure 5:
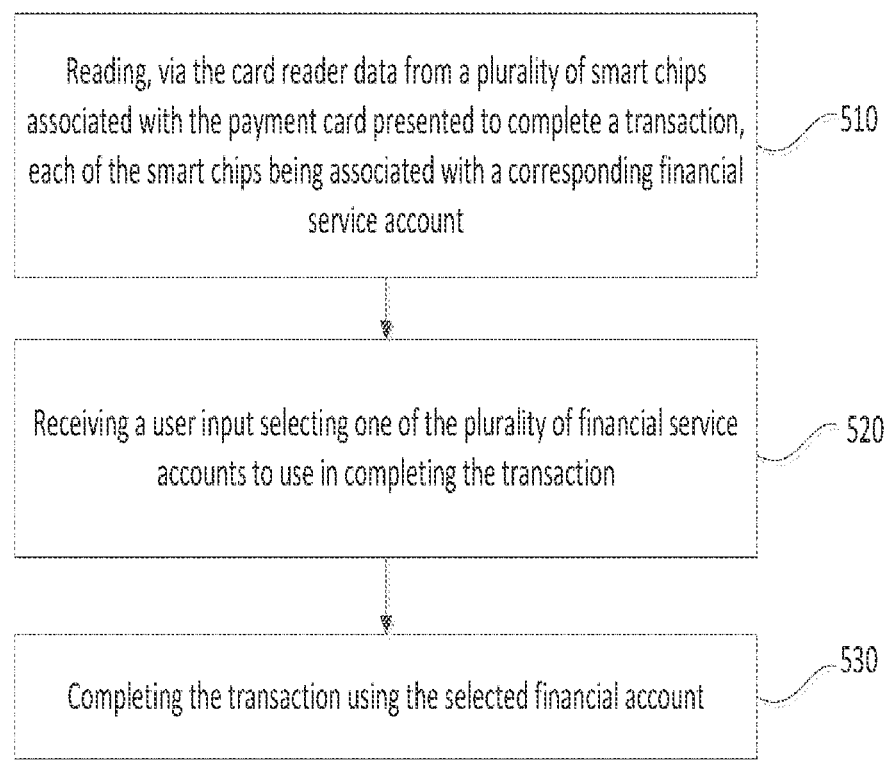
FIG. 5 is a flowchart of an exemplary process for transacting using a multi-faced payment card with partitioned dual smart chips and antennae, consistent with disclosed embodiments.

FIG. 5 shows an exemplary method for transacting a payment using a card reader having a user input, consistent with disclosed embodiments. Process 500 may be performed by processor 210 of, for example, local FSP device 130 executing instructions encoded on a computer-readable medium storage device. It is to be understood, however, that one or more steps of process 400 may be implemented by other components of system 100 (shown or not shown), including user device 110. In some embodiments, card reader of local FSP device 130 may read multiple antennae from card 300 when the user is attempting to execute a contactless payment. In such an embodiment, the user may use user device 110 to confirm the correct financial service account associated with card 300 to charge.

At step 510, local FSP device 130 may read, via a card reader data from a plurality of antennae associated with the payment card presented to complete a transaction, each of the antennae being associated with a corresponding financial service account. In some embodiments, a user may provide payment card 300 to a card reader of local FSP device 130 to complete a transaction by either swiping the magnetic strip of payment card 300, inserting one of the chips of payment card 300 into a card reader, or using a "tap to pay" contactless payment feature using the antennae of payment card 300. The latter option utilizes wireless communication (e.g., NFC) to energize the antennae of the card in order to receive information from each antenna's associated chip. In some embodiments, card reader may read multiple antennae when the user taps to pay, each antenna associated with a chip and a particular payment account.

At step 520, local FSP device 130 may receive a user input from user device 110 selecting one of the plurality of financial service accounts to use in completing the transaction. In some embodiments, the user input may be indicated via a mobile application, a text message, or an e-mail message. In some embodiments, local FSP device 130 may communicate with another server to initiate the indication. In other embodiments, local FSP device 130 may directly communicate with user device 110. In yet other embodiments, the user may receive the indication upon opening an online application on user device 110. Alternatively, the user prompted to open an indication via an application on user device 110.

At step 530, local FSP device 130 may complete the transaction using the selected financial account. For example, local FSP device 130 may transmit information associated with the selected financial service account to the appropriate payment processing network or to the appropriate financial provider associated with the selected financial service account to fulfill the requested transaction. In some embodiments, a confirmation of sufficient funds or other appropriate authorization may be received. Upon receiving such a confirmation, the local FSP device 130 may indicate that the transaction has been successful. Additional processing may then be undertaken. For example, if the local FSP device 130 is an ATM, the local FSP device 130 may dispense funds and provide an itemized receipt including details of the ATM transaction. In other embodiments, local FSP device 130 may provide the user with confirmation the card has been successfully charged and provide a receipt via local FSP device 103, a mobile application, a text message, or an e-mail message.

In some embodiments, local FSP device 130 may print a receipt listing the performed transaction. In other embodiments, local FSP device 130 may send an electronic receipt to user device 110.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java™, C, C++, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A computer system for reducing signal interference between a plurality of chips on a card, the computer system comprising:
    one or more memory devices storing instructions; and
    one or more processors configured to perform operations, the operations comprising:
        energizing, via a card reader device, both first and second antennas of a card, wherein:
            a first smart chip of the card is associated with a first account;
            a second smart chip of the card is associated with a second account;
            the first antenna is coupled to the first smart chip to provide contactless access to the first smart chip;
            the second antenna is coupled to the second smart chip to provide contactless access to the second smart chip and is not in electrically conductive contact with the first antenna; and
            the card comprises a radiofrequency (RF) block positioned between the first and second antennas;
        in response to the energizing of both the first and second antennas, receiving a first RF signal via the first antenna and a second RF signal via the second antenna, wherein the RF block shields the first RF signal from signal interference generated by the second antenna and shields the second RF signal from signal interference generated by the first antenna;
        receiving a user input via the card reader device, wherein the user input indicates a user selection of an account; and
        sending data of the account to a network associated with the account such that (i) data of the first account derived from the first RF signal is sent to a network associated with the first account in response to the selected account being the first account and (ii) data of the second account derived from the second RF signal is sent to a network associated with the second account in response to the selected account being the second account.

2. The computer system of claim 1, wherein the card reader device comprises a near-field communication device, and wherein energizing comprises energizing with the near-field communication device.

3. The computer system of claim 1, wherein the network associated with the first account is a first network, and wherein the network associated with the second account is a second network different from the first network.

4. The computer system of claim 1, wherein sending data of the account comprises:
collecting a first set of biometric data from a user associated with the account, wherein the first set of biometric data is collected from a plurality of sources of the user;
obtaining a stored set of biometric data from the network associated with the account;
determining whether the first set of biometric data satisfies an authentication criterion based on the stored set of biometric data; and
based on the first set of biometric data satisfying the authentication criterion, sending the data of the account to the network associated with the account.

5. The computer system of claim 1, wherein the card reader device is part of a plurality of distributed servers, and wherein sending the data of the account to the network associated with the account comprises sending the data of the account to a server of the plurality of distributed servers, the operations further comprising storing the data of the account in a database of the plurality of distributed servers.

6. A non-transitory, machine-readable medium storing instructions that, when executed by one or more processors, performs operations comprising:
energizing, via a card reader device, a first antenna and a second antenna of a card comprising:
a first smart chip coupled to the first antenna;
a second smart chip coupled to the second antenna, wherein the first antenna is not in electrically conductive contact with the second antenna; and
a radiofrequency (RF) block is positioned between the first antenna and the second antenna;
in response to the energizing of the first antenna and the second antenna, receiving a first RF signal via the first antenna and a second RF signal via the second antenna, wherein the RF block shields the first RF signal from signal interference generated by the second antenna and shields the second RF signal from signal interference generated by the first antenna;
receiving a user input indicating a selection of an account; and
sending data of the account to a network associated with the account such that (i) data of the first account derived from the first RF signal is sent to a network associated with the first account in response to the selected account being the first account and (ii) data of the second account derived from the second RF signal is sent to a network associated with the second account in response to the selected account being the second account.

7. The medium of claim 6, the operations further comprising obtaining an authentication message from a second computing device, wherein sending the data of the account comprises sending data of the first account in response to obtaining the authentication message.

8. The medium of claim 6, wherein receiving the user input comprises receiving the user input via a mobile application.

9. The medium of claim 6, wherein the card comprises:
a third smart chip and a fourth smart chip;
a third antenna coupled to the third smart chip; and
a fourth antenna coupled to the fourth smart chip, wherein the operations further comprise:
energizing the third antenna and the fourth antenna to receive a third RF signal and a fourth RF signal, wherein the RF block shields the third RF signal from signal interference generated by the fourth antenna and shields the fourth RF signal from signal interference generated by the third antenna.

10. The medium of claim 9, the operations further comprising displaying identifiers of the first account and the second account in response to receiving the third RF signal and receiving the fourth RF signal.

11. The medium of claim 6, wherein the user input is provided via a user device, the operations further comprising providing the user device with data stored in a local memory of the card reader device.

12. The medium of claim 6, wherein receiving the user input comprises receiving the user input via the Internet.

13. The medium of claim 6, wherein the network associated with the account is a dedicated network associated with the account.

14. A method comprising:
energizing, via a card reader device, a first antenna and a second antenna of a card comprising:
a first smart chip coupled to the first antenna;
a second smart chip coupled to the second antenna, wherein the first antenna is not in electrically conductive contact with the second antenna; and
a radiofrequency (RF) block is positioned between the first and second antennas;
in response to the energizing of the first antenna and the second antenna, receiving a first RF signal via the first antenna and a second RF signal via the second antenna, wherein the RF block shields the first RF signal from signal interference generated by the second antenna and shields the second RF signal from signal interference generated by the first antenna;
receiving a user input indicating a selection of an account; and
sending data of the account to a network associated with the account such that (i) data of the first account derived from the first RF signal is sent to a network associated with the first account in response to the selected account being the first account and (ii) data of the second account derived from the second RF signal is sent to a network associated with the second account in response to the selected account being the second account.

15. The method of claim 14, wherein sending data of the account comprises:
obtaining, in response to receiving the user input, a first transaction amount associated with the first account and obtaining a second transaction amount associated with the second account;
sending the first transaction amount to the network associated with the first account; and
sending the second transaction amount to the network associated with the second account.

16. The method of claim 14, further comprising sending an electronic message to an electronic address of a user identified by the user input, wherein the electronic message comprises a record of a transaction associated with the account.

17. The method of claim 14, further comprising obtaining a confirmation message associated with the account, wherein the confirmation message indicates that a value of the account satisfies a threshold.

18. The method of claim 14, further comprising:
   selecting the account;
   displaying an indication of the account on a display of the card reader device; and
   displaying a request for a confirmation of the selection of the account on the display of the card reader device.

19. The method of claim 14, wherein energizing the first antenna and the second antenna comprises concurrently energizing the first antenna and the second antenna.

20. The method of claim 14, wherein receiving the first RF signal and receiving the second RF signal comprises concurrently receiving the first and second RF signals.

* * * * *